(12) United States Patent
Park et al.

(10) Patent No.: US 9,207,796 B2
(45) Date of Patent: Dec. 8, 2015

(54) LIQUID CRYSTAL DISPLAY DEVICE WITH TOUCH SCREEN FUNCTION

(75) Inventors: Jun Baek Park, Yongin-Si (KR); Min Cheol Kim, Icheon-Si (KR)

(73) Assignee: Hydis Technologies Co., Ltd., Icheon-Si (KR)

( * ) Notice: Subject to any disclaimer, the term of this patent is extended or adjusted under 35 U.S.C. 154(b) by 1529 days.

(21) Appl. No.: 12/574,463

(22) Filed: Oct. 6, 2009

(65) Prior Publication Data

US 2010/0134448 A1    Jun. 3, 2010

(30) Foreign Application Priority Data

Dec. 3, 2008  (KR) .................. 10-2008-0121708

(51) Int. Cl.
  *G06F 3/042*  (2006.01)
  *G06F 3/041*  (2006.01)
  *G02F 1/1333*  (2006.01)
  *G06F 3/045*  (2006.01)
  *G02F 1/13363*  (2006.01)

(52) U.S. Cl.
  CPC .......... *G06F 3/0412* (2013.01); *G02F 1/13338* (2013.01); *G06F 3/045* (2013.01); *G02F 1/13363* (2013.01)

(58) Field of Classification Search
  CPC .................. G06F 3/0421; G06F 2203/04109; G06F 3/037

USPC ............ 345/55, 72, 77, 87–88, 92, 156, 166, 345/169, 173–176, 214, 699; 178/18.01
  See application file for complete search history.

(56) References Cited

U.S. PATENT DOCUMENTS

| 6,538,706 B2* | 3/2003 | Sun | 349/12 |
| 2009/0015761 A1* | 1/2009 | Stockham | 349/96 |
| 2011/0261296 A1* | 10/2011 | Park | 349/96 |

FOREIGN PATENT DOCUMENTS

| JP | 2000276301 A | 10/2000 |
| KR | 1020040039987 A | 5/2004 |
| KR | 1020060086742 A | 8/2006 |

* cited by examiner

Primary Examiner — Kumar Patel
Assistant Examiner — Mansour M Said
(74) Attorney, Agent, or Firm — The Webb Law Firm

(57) ABSTRACT

A liquid crystal display (LCD) device with a touch screen function is provided. The LCD device includes a liquid crystal panel layer including a liquid crystal layer filled between first and second substrates, and a touch panel layer which is formed on the first substrate, includes at least one phase compensating means stacked therein, and detects a contact point when an upper electrode and a lower electrode come into contact with each other due to external pressure, wherein the phase compensating means is patterned so that the upper electrode and the lower electrode are able to contact each other, and thus outdoor visibility and viewing angle characteristics can be effectively improved.

11 Claims, 4 Drawing Sheets

LIQUID CRYSTAL DISPLAY DEVICE WITH TOUCH SCREEN FUNCTION

CROSS-REFERENCE TO RELATED APPLICATION

This application claims priority to and the benefit of Korean Patent Application No. 2008-121708, filed on Dec. 3, 2008, the disclosure of which is incorporated herein by reference in its entirety.

BACKGROUND

1. Field of the Invention

The present invention relates to a liquid crystal display (LCD) device with a touch screen function, and more particularly, to an LCD device with a touch screen function in which outdoor visibility and viewing angle characteristics are effectively improved.

2. Discussion of Related Art

In general, image display devices include an electroluminescent (EL) panel, a cathode ray tube (CRT), a light emitting diode (LED), a plasma display panel (PDP), and a liquid crystal display (LCD) device.

Among these image display devices, an LCD device obtains a desired image signal by applying an electric field to a liquid crystal material having an anisotropic dielectric constant filled between an array substrate on which thin film transistors (TFTs) are formed and a color filter substrate, and adjusting the strength of the electric field to adjust the amount of light transmitting the substrate.

Such an LCD device is a flat panel display device which has advantages of small, compact size and low power consumption, and is widely used in portable computers such as laptop computers, office automation apparatuses, and audio/video apparatuses.

A digitizer which provides a function for inputting an electrical graphic signal on a screen on which an image is displayed is mounted in an LCD device. Such a digitizer is called an electric graphic input panel (EGIP) or a touch panel. A digitizer mounted in an LCD device is also called a touch screen or tablet.

Recently, as the high resolution of LCD devices is being realized due to rapid development of LCD technology, high-resolution graphic processing can be conducted, and a digitizer is being used even in laptop computers as an input device.

FIG. 1 is a cross-sectional view of a conventional LCD device with a touch screen function.

Referring to FIG. 1, the conventional LCD device with a touch screen function is an LCD device of a typical in-plane switching (IPS) mode, and includes a liquid crystal panel layer LP which includes first and second substrates 1 and 2 which are opposite to each other and a liquid crystal layer 3 filled between the first and second substrates 1 and 2, A and C plates 4 and 5 sequentially formed on the first substrate 1, a first polarizer 6 formed on the C plate 5, a second polarizer 7 formed below the second substrate 2, and a touch panel 8 formed on the first polarizer 6.

The first substrate 1 is a color filter (C/F) substrate, and commonly includes a light shielding layer (black matrix (BM)) for preventing light leakage and color filter layers of red (R), green (G) and blue (B) for realizing a color image, although not shown in the drawing.

The second substrate 2 is a TFT array substrate, and commonly includes gate and data lines for defining a unit pixel, a TFT formed at an intersection of the gate and data lines, a common electrode, and a pixel electrode, although not shown in the drawing.

The touch panel 8 is, for example, a resistive digitizer, and includes an upper substrate 8a of a film form on which an upper electrode (not shown) is formed, a lower substrate 8b on which a lower electrode (not shown) is formed, and a spacer 8c which provides a predetermined space between the upper substrate 8a and the lower substrate 8b.

If a predetermined input means such as a finger or a pen contacts a certain point on the upper substrate 8a, the upper electrode formed on the upper substrate 8a and the lower electrode formed on the lower substrate 8b are electrically connected to each other. At this time, a control unit reads a voltage value changed by a resistance value at the contact point and pinpoints position coordinates according to a change in electric potential difference.

However, such an LCD device with a touch screen function as described above has a problem in that since an air gap exists due to the spacer 8c disposed inside the touch panel 8, surface reflectance is increased, and thus outdoor visibility is deteriorated.

SUMMARY OF THE INVENTION

The present invention is directed to an LCD device with a touch screen function in which an air gap is removed by forming a phase compensating means or a polarization means in an air gap area formed inside the existing touch panel, so that outdoor visibility and viewing angle characteristics can be effectively improved.

According to an aspect of the present invention, a liquid crystal display (LCD) device with a touch screen function includes: a liquid crystal panel layer including a liquid crystal layer filled between first and second substrates; and a touch panel layer which is formed on the first substrate, includes at least one phase compensating means stacked therein, and detects a contact point when an upper electrode and a lower electrode come into contact with each other due to external pressure, wherein the phase compensating means is patterned so that the upper electrode and the lower electrode are able to contact each other.

The phase compensating means may be formed of a single plate (or layer) or multiple plates (or layers). A plate means a form into which an independent structure is inserted, and a layer means a form that is stacked on a lower structure using a technique such as deposition. For example, if a single plate is inserted, either an A plate or a C plate may be stacked, and if two plates are inserted, both the A plate and the C plate may be stacked. Here, the phase compensating means may be patterned so that the upper and lower electrodes are able to contact each other.

The phase compensating means may include at least one of an A plate, a C plate, A and C plates, a $\lambda/4$ phase retardation film, and a $\lambda/2$ phase retardation film. A polarization means may be added to at least one phase compensating means. This means, for example, that a single phase retardation plate ($\lambda/4$) and a polarizer may be added together.

If the phase compensating means is formed of the A and C plates, a polarizer may be further formed below the second substrate. The polarizer may include a polymer polarization medium layer for polarizing incident light and an ORT protection layer formed on a top surface of the polymer polarization medium layer.

Also, the touch panel layer may include a discrete lower substrate, but it is more efficient to use the first substrate as a lower substrate of the touch panel layer.

If a space corresponding to the height of an air gap is not secured, a protection layer may be added to secure a space corresponding to the height of an air gap. For example, if an air gap is 3 µM to 5 µm and the phase retardation plate is 0.2 µm, the whole thickness may be adjusted by adding a protection layer of a predetermined thickness. In this instance, the protection layer may be patterned such that the upper and lower electrodes are able to contact each other.

Also, if the phase compensating means is a phase retardation plate, the touch panel layer includes: a touch plate which includes a first electrode formed on the first substrate and a second electrode which is formed apart from a top surface of the first substrate and opposite to the first electrode; and a polarization layer which is formed between the first substrate and the touch plate and is stacked on a top surface of the first substrate. The polarization layer may be formed in the same shape as the phase retardation plate.

The phase retardation plate may include a λ/4 phase retardation film, and the polarization layer may be formed at a location corresponding to a pixel area of the liquid crystal panel layer. The polarization layer may include a polymer polarization medium layer of a film form for polarizing incident light, and a polarizer may be further formed below the second substrate. The polarizer may include a polymer polarization medium layer which is formed in the center to polarize incident light and a pair of protection layers which are formed on both sides of the polymer polarization medium layer.

According to another aspect of the present invention, a liquid crystal display (LCD) device includes: a liquid crystal panel layer including a liquid crystal layer filled between first and second substrates; and a touch panel layer which is formed on the first substrate, includes a polarization means stacked therein, and detects a contact point when an upper electrode and a lower electrode come into contact with each other due to external pressure, wherein the polarization means is patterned so that the upper electrode and the lower electrode are able to contact each other.

The first substrate may function as a lower substrate of the touch panel layer.

A patterned protection layer may be formed on or below the polarization means, and the polarization means may be formed of a single plate (or layer) or multiple plates (or layers).

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications may be made without departing from the spirit and scope of the invention.

First Exemplary Embodiment

Figure 2:
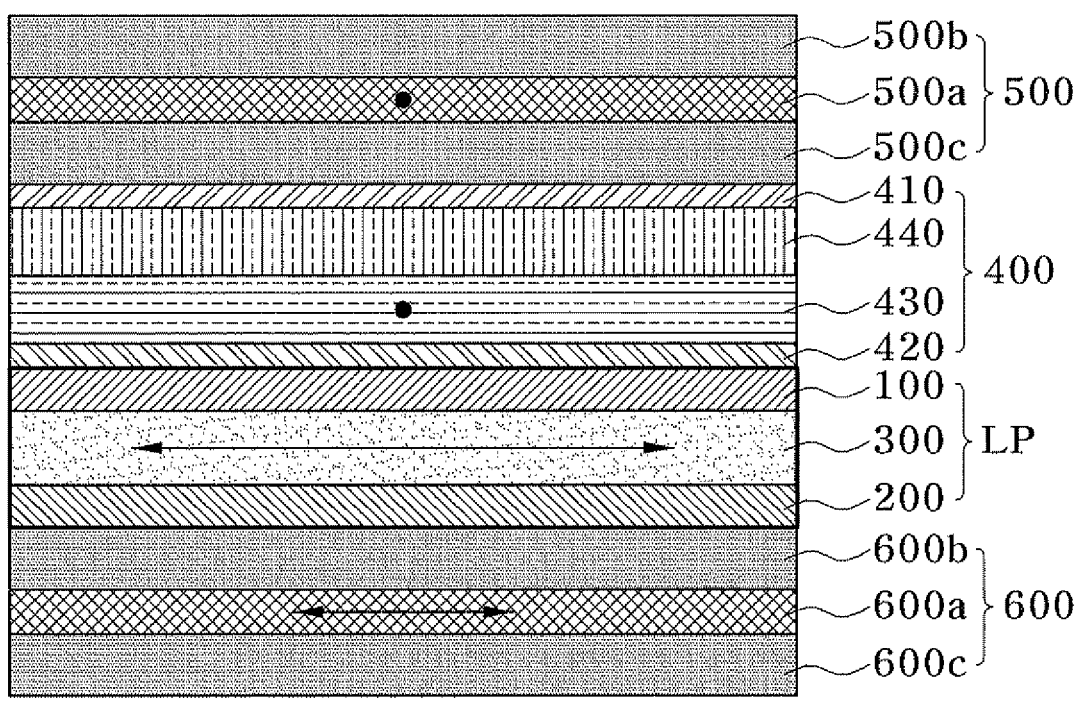
FIG. 2 is a cross-sectional view of an LCD device with a touch screen function according to a first exemplary embodiment of the present invention.
Figure 3:
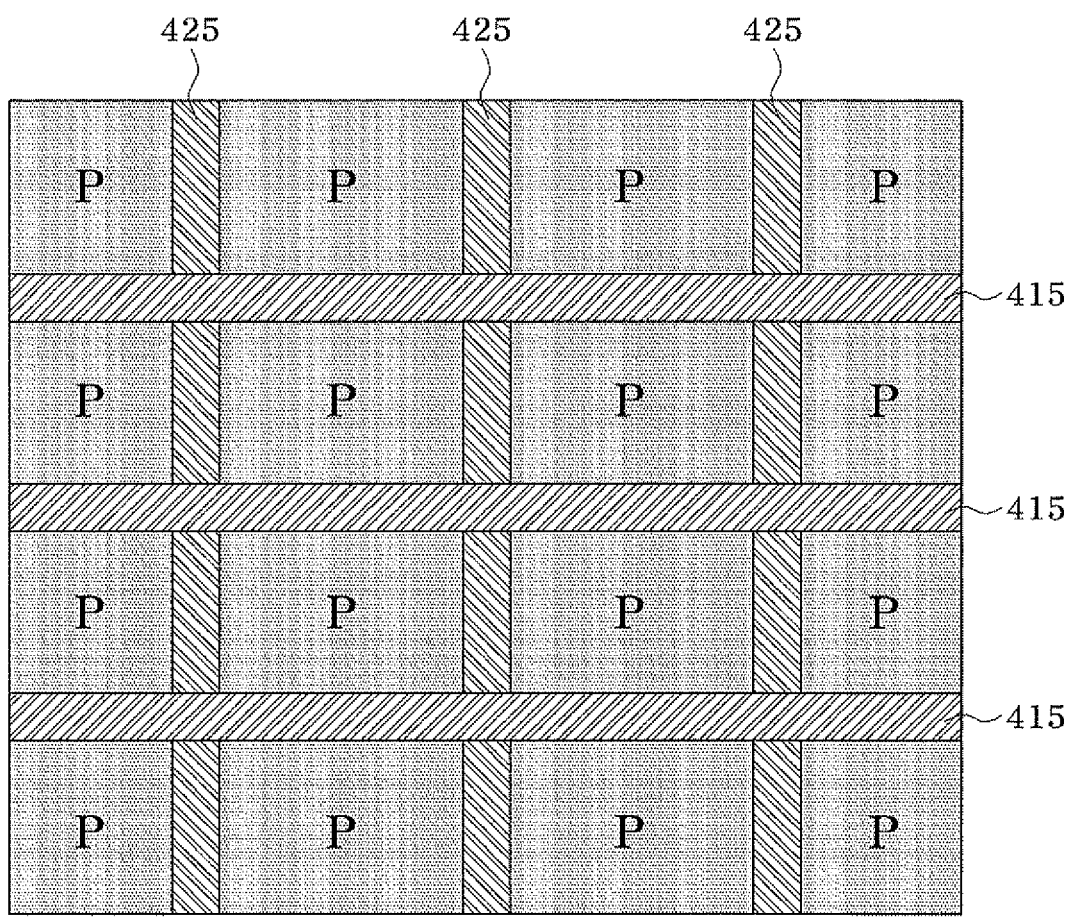
FIG. 3 is a plan view illustrating a touch panel layer according to the first exemplary embodiment of the present invention.

FIG. 2 is a cross-sectional view of an LCD device with a touch screen function according to a first exemplary embodiment of the present invention, and FIG. 3 is a plan view illustrating a touch panel layer according to the first exemplary embodiment of the present invention.

Referring to FIGS. 2 and 3, the LCD device with a touch screen function according to the first exemplary embodiment of the present invention includes a liquid crystal panel layer LP which includes first and second substrates 100 and 200 which are opposite to each other and a liquid crystal layer 300 filled between the first and second substrates 100 and 200, a touch panel layer 400 formed on the first substrate 100, a first polarizer 500 formed on the touch panel layer 400, and a second polarizer 600 formed below the second substrate 200.

The first substrate 100 is a color filter (C/F) substrate, and commonly includes a light shielding layer (black matrix (BM)) for preventing light leakage and color filter layers of red (R), green (G) and blue (B) for realizing a color image, although not shown in the drawing.

The second substrate 200 is a TFT array substrate, and commonly includes gate and data lines for defining a unit pixel, a TFT formed at an intersection of the gate and data lines, a common electrode, and a pixel electrode, although not shown in the drawing.

The liquid crystal layer 300 is filled between the first and second substrates 100 and 200 and has birefringence in which a long axis direction and a short axis direction of liquid crystal molecules are different in refractive index. Since the refractive index becomes different according to a viewing location of the LCD device due to birefringence, a phase difference occurs when a polarization state changes while linearly polarized light passes through the liquid crystal, and thus an amount of light when viewed from the front is different from that when viewed from a location other than the front.

That is, an LCD device using a liquid crystal material undergoes a phenomenon such as a change in contrast ratio, a color shift and a gray scale inversion according to a viewing angle, and undesired light leakage.

In order to resolve the above problem, a phase difference compensation film is employed as a method for compensating for a phase difference which occurs in the liquid crystal panel layer LP. To this end, in the LCD device according to the first exemplary embodiment of the present invention, an A plate 430 for compensating for a difference of a horizontal refractive index of the liquid crystal layer 300 and a C plate 440 for compensating for a difference of a vertical refractive index of the liquid crystal layer 300 are formed inside the touch panel 400.

The touch panel 400 includes upper and lower substrates 410 and 420 and the A and C plates 430 and 440 which are formed between the upper and lower substrates 410 and 420 and are sequentially stacked on the lower substrate 420.

Figure 1:
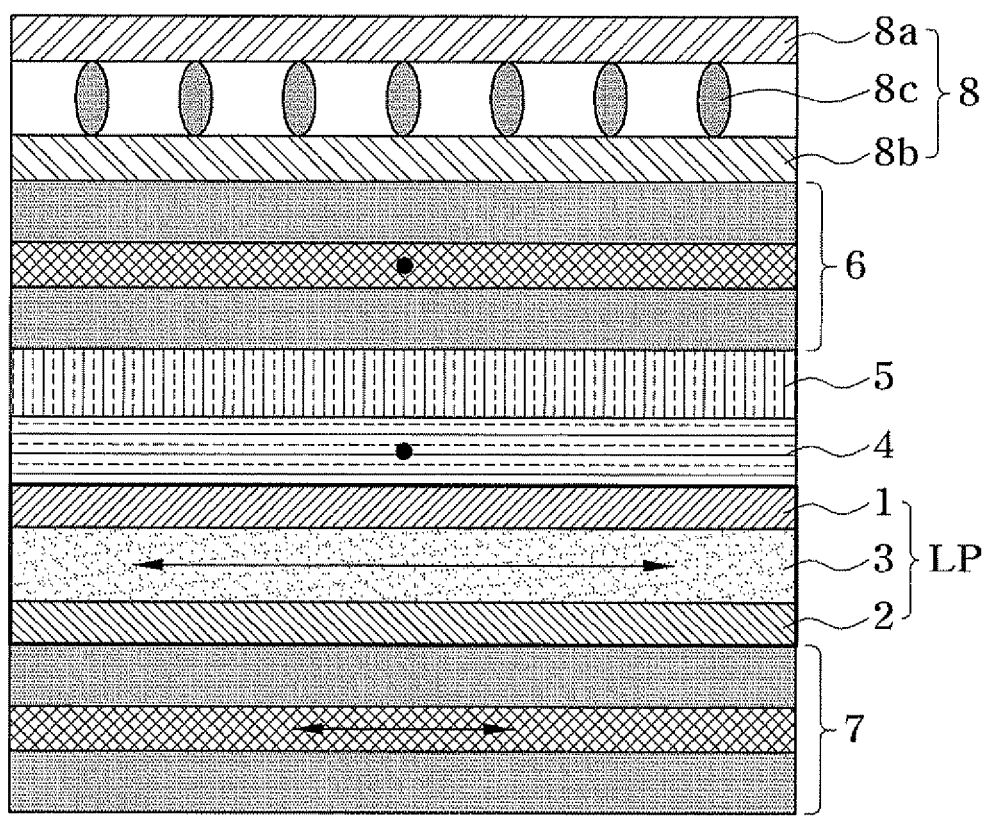
FIG. 1 is a cross-sectional view of a conventional LCD device with a touch screen function.

The touch panel layer 400 is a resistive digitizer like the conventional touch panel (8 in FIG. 1) and includes the upper substrate 410 of a film form on which an upper electrode (415 in FIG. 3) is formed, the lower substrate 420 on which a lower electrode (425 in FIG. 3) is formed, and the A and C plates 430 and 440 which are sequentially formed between the upper and lower substrates 410 and 420.

The upper electrode 415 and the lower electrode 425 are formed in a lattice form in which a plurality of metal lines are disposed at regular intervals to cross each other. Preferably, the upper electrode 415 is formed in the same direction as a gate line, and the lower electrode 425 is formed in the same direction as a data line.

The upper and lower electrodes 415 and 425 may be made of a transparent conductive metal having excellent light transmittance like indium tin oxide (ITO) or indium zinc oxide (IZO).

The A and C plates 430 and 440 are compensation films for compensating for a phase difference occurring in the liquid crystal panel layer LP. A refractive index of a liquid crystal is indicated by three vectors of nx, ny and nz. The A plate 430 is a film for compensating for a difference between nx and ny, that is, a difference of a horizontal refractive index, and the C plate 440 is a film for compensating for a difference between nz and ny, that is, a difference of a vertical refractive index.

The A and C plates 430 and 440 also play the same role as the spacer (8c in FIG. 1) disposed inside the conventional touch panel 8.

A phase difference value of the A and C plates 430 and 440 may be changed according to a liquid crystal mode. Meanwhile, as shown in FIG. 3, the A and C plates 430 and 440 are preferably formed at a location corresponding to a liquid crystal cell area, that is, a pixel area (P).

Therefore, since the A and C plates may be formed inside the touch panel, a cost down effect is obtained, and since the inside of the touch panel is filled with a medium, surface reflectance is reduced, and thus outdoor visibility can be effectively improved.

Patterning is performed such that the A and C plates 430 and 440 are formed only inside ITO interconnections (i.e., internal region formed by the upper electrode 415 and the lower electrode 425), and thus the upper electrode 415 and the lower electrode 425 come into ITO contact with each other due to touch. Patterning of the A and C plates 430 and 440 may be performed using, for example, a photolithography technique.

If a predetermined input means such as a finger or a pen contacts a certain point on the upper substrate 410 of the touch panel layer 400, the upper electrode 415 formed on the upper substrate 410 is electrically connected to the lower electrode 425 formed on the lower substrate 420. At this time, a control unit reads a voltage value changed by a resistance value at the contact point and pinpoints position coordinates according to a change in electric potential difference.

The first and second polarizers 500 and 600 are stretched films which are attached to both outmost sides of the liquid crystal panel layer LP and include multiple films such as a triacetate cellulose (TAC) film, a polyvinyl alcohol (PVA) film, a protection film, and a release film. The first and second polarizers 500 and 600 provide polarized light by transmitting only light having an oscillation plane of a certain direction among natural light having an omni-directional oscillation plane of 360° and absorbing the remaining light.

Specifically, the first polarizer 500 basically includes a plurality of films. That is, a polymer polarization medium layer 500a for polarizing incident light is disposed in the center, and first and second protection layers 500b and 500c are formed as a support layer on both sides of the polymer polarization medium layer 500a.

Meanwhile, the first and second protection layers 500b and 500c may be formed of, for example, a TAC layer. The TAC layer may be replaced by different kinds of compensation films.

The second polarizer 600 basically includes a plurality of films. That is, a polymer polarization medium layer 600a for polarizing incident light is disposed in the center, a third protection layer 600b is attached to a top surface of the polymer polarization medium layer 600a, and a fourth protection layer 600c is attached to a bottom surface of the polymer polarization medium layer 600a.

The third protection layer 600b functions as both of the A plate 430 and the TAC layer. That is, the third protection layer 600b is a Zero Retardation TAC (ORT) layer.

The fourth protection layer 600c may be formed of a TAC layer like the first and second protection layers 500b and 500c. The TAC layer may be replaced by different kinds of compensation films.

A light transmitting axis of the first polarizer 500 has an angle of 90° with respect to a light transmitting axis of the second polarizer 600.

Meanwhile, in the first exemplary embodiment of the present invention as described above, the lower substrate 420 of the touch panel 400 is disposed on the first substrate 100 of the liquid crystal panel layer LP, but the present invention is not limited thereto. For example, the touch panel layer 400 having no lower substrate 420 may be attached directly to a top surface of the first substrate 100. That is, the lower substrate 420 of the touch panel 400 may be replaced by the first substrate 100 of the liquid crystal panel layer LP.

Second Exemplary Embodiment

Figure 4:
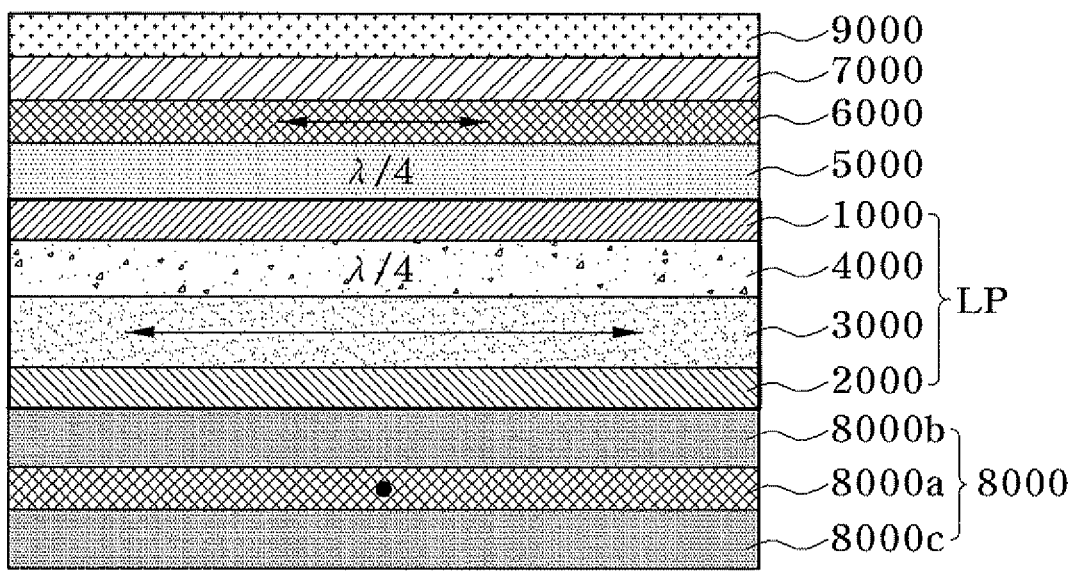
FIG. 4 is a cross-sectional view of an LCD device with a touch screen function according to a second exemplary embodiment of the present invention.

FIG. 4 is a cross-sectional view of an LCD device with a touch screen function according to a second exemplary embodiment of the present invention.

Referring to FIG. 4, the LCD device with a touch screen function according to the second exemplary embodiment of the present invention includes a liquid crystal panel layer LP which includes first and second substrates 1000 and 2000 which are opposite to each other and a liquid crystal layer 3000 filled between the first and second substrates 1000 and 2000, a first phase retardation plate 4000 interposed between the first substrate 1000 and the liquid crystal layer 3000, a second phase retardation plate 5000 formed on the first substrate 1000, a polarization layer 6000 formed on the second phase retardation plate 5000, a touch plate 7000 formed on the polarization layer 6000, and a polarizer 8000 formed below the second substrate 2000.

The first substrate 1000, the first phase retardation plate 4000, the polarization layer 6000, and the touch plate 7000 perform the same function as the touch panel layer (400 in FIG. 2) applied in the first exemplary embodiment of the present invention. The touch plate 7000 corresponds to the upper substrate (410 in FIG. 2) of the touch panel layer 400 and has an upper electrode (not shown) which is identical to the upper electrode (415 in FIG. 3).

The first substrate 1000 performs both a function of the lower substrate (420 in FIG. 2) of the touch panel layer 400 and a function of the first substrate (100 in FIG. 2) of the liquid crystal panel layer LP, which are applied in the first exemplary embodiment of the present invention.

That is, the first substrate 1000 is a color filter (C/F) substrate and includes a light shielding layer (black matrix (BM)) for preventing light leakage and color filter layers of red (R), green (G) and blue (B) for realizing a color image, although not shown in the drawing. Also, a lower electrode (not shown) is formed on the first substrate 1000 like the lower substrate 420 of the touch panel layer 400.

The first and second phase retardation plates 4000 and 5000 function to change a polarization state of light. For example, as the first and second phase retardation plates 4000 and 5000, either or both of a λ/4 phase retardation film which employs a quarter wave plate (QWP) having a phase difference of λ/4(λ=550 nm) to convert circularly polarized incident light into linearly polarized light or linearly polarized light into circularly polarized light and a λ/2 phase retardation film which converts circularly polarized light into circularly polarized light which is rotated by a predetermined angle or linearly polarized light into linearly polarized light which is rotated by a predetermined angle may be used.

The λ/4 phase retardation film functions to retard a phase of transmitting light by λ/4, and the λ/2 phase retardation film functions to retard a phase of transmitting light by λ/2.

The polarization layer 6000 is preferably formed of a polymer polarization medium layer which is disposed on a top surface of the second retardation plate 5000 in a film form to polarize incident light.

Here, a protection film (not shown) may be disposed on the polarization layer 6000, between the polarization layer 6000 and the second phase retardation plate 5000 and/or between the second phase retardation plate 5000 and the first substrate 1000.

The second phase retardation plate 5000 and the polarization layer 6000 formed between the first substrate 1000 and the touch plate 7000 may be formed at a location corresponding to a pixel area P (see FIG. 3) of the liquid crystal panel layer LP.

The polarizer 8000 has the same structure as the first polarizer 500 applied in the first exemplary embodiment of the present invention. That is, a polymer polarization medium layer 8000a for polarizing incident light is disposed in the center and first and second protection layers 8000b and 8000c are formed as a support layer on both sides of the polymer polarization medium layer 8000a.

The first and second protection layers 8000b and 8000c may be formed of, for example, a TAC layer. The TAC layer may be replaced by different kinds of compensation films.

Reference numeral 9000 denotes a coating layer which is a low reflecting layer and that anti-reflection (AR) surface treatment is applied to its surface, and is formed on the touch plate 7000.

The anti-reflection surface treatment is a method of repeatedly coating different inorganic dielectric materials to cause destructive interference between incident light and reflected light, thereby reducing reflected light. Such anti-reflection treatment methods are mainly classified into methods of multi-coating various kinds of metal oxides which are different in optical refractive index from each other by deposition and methods of coating a material with a low refractive index such as a fluoric compound on a surface of a polarizer.

The methods of multi-coating by deposition are high in cost, but low in surface reflectance and excellent in performance, compared to the methods of coating a material of a low refractive index.

As described above, an LCD device with a touch screen function according to the present invention has an advantage that an air gap is removed by forming a phase compensating means or a polarization means in an air gap area formed inside the existing touch panel, and thus outdoor visibility and viewing angle characteristics can be effectively improved.

Also, according to the present invention, a discrete spacer process is not required.

In addition, according to the present invention, since a phase difference compensation film or a polarizer is formed inside the touch panel, not only is a cost down effect obtained, but also the LCD device becomes more compact, and since the inside of the touch panel is filled with a medium, surface reflectance can be effectively reduced.

It will be apparent to those skilled in the art that various modifications may be made to the above-described exemplary embodiments of the present invention without departing from the spirit or scope of the invention. Thus, it is intended that the present invention cover all such modifications provided they come within the scope of the appended claims and their equivalents.

For example, in the exemplary embodiments of the present invention, a touch screen is applied to an LCD device of a typical IPS mode, but the present invention is not limited to this and may be applied to all LCD devices, such as a fringe field switching (FFS) mode as well as a vertically aligned nematic (VAN) mode, a hybrid aligned nematic (HAN) mode, or an optically compensated birefringence (OCB) mode using a nematie liquid crystal.

What is claimed is:

1. A liquid crystal display (LCD) device with a touch screen function, comprising:
    a liquid crystal panel layer including a liquid crystal layer filled between first and second substrates; and
    a touch panel layer which is formed on the first substrate, includes at least one phase compensating means stacked inside the touch panel, and detects a contact point when an upper electrode and a lower electrode come into contact with each other due to external pressure,
    wherein the phase compensating means is patterned so that the upper electrode and the lower electrode are able to contact each other and the phase compensating means is formed at a location corresponding to a pixel area (P), without an air gap.

2. The LCD device of claim 1, wherein the first substrate functions as a lower substrate of the touch panel layer.

3. The LCD device of claim 1, wherein the touch panel layer further includes a polarization means which is formed therein and patterned identically to a pattern of the phase compensating means.

4. The LCD device of claim 1, wherein the phase compensating means includes at least one of an A plate, a C plate, A and C plates, a λ/4 phase retardation film, and a λ/2 phase retardation film.

5. The LCD device of claim 4, wherein when the phase compensating means is formed of the A and C plates, a polarizer is formed below the second substrate, and the polarizer includes a polymer polarization medium layer for polarizing incident light and an ORT protection layer formed on a top surface of the polymer polarization medium layer.

6. The LCD device of claim 1, wherein a protection layer patterned identically to a pattern of the phase compensating means is further formed on or below the phase compensating means.

7. The LCD device of claim 1, wherein the phase compensating means is patterned to be formed at a location corresponding to a pixel area of the liquid crystal panel layer.

8. A liquid crystal display (LCD) device, comprising:
    a liquid crystal panel layer including a liquid crystal layer filled between first and second substrates; and
    a touch panel layer which is formed on the first substrate, includes a polarization means stacked inside the touch panel, and detects a contact point when an upper electrode and a lower electrode come into contact with each other due to external pressure,
    wherein the polarization means is patterned so that the upper electrode and the lower electrode are able to contact each other and the polarization means is formed at a location corresponding to a pixel area (P), without an air gap.

9. The LCD device of claim 8, wherein the first substrate functions as a lower substrate of the touch panel layer.

10. The LCD device of claim 8, wherein the polarization means is formed at a location corresponding to a pixel area of the liquid crystal panel layer.

11. The LCD device of claim 8, wherein a protection layer patterned identically to a pattern of the polarization means is further formed on or below the polarization means.

* * * * *